(12) United States Patent
Promersberger et al.

(10) Patent No.: US 7,900,724 B2
(45) Date of Patent: Mar. 8, 2011

(54) HYBRID DRIVE FOR HYDRAULIC POWER

(75) Inventors: Jon Promersberger, Watertown, SD (US); John Pantzke, Estelline, SD (US)

(73) Assignee: Terex-Telelect, Inc., Watertown, SD (US)

( * ) Notice: Subject to any disclaimer, the term of this patent is extended or adjusted under 35 U.S.C. 154(b) by 154 days.

(21) Appl. No.: 12/052,157

(22) Filed: Mar. 20, 2008

(65) Prior Publication Data

US 2009/0236156 A1 Sep. 24, 2009

(51) Int. Cl.
*B60K 25/06* (2006.01)
(52) U.S. Cl. .............................. 180/53.4; 60/413; 60/414
(58) Field of Classification Search .................... 60/413, 60/414; 180/53.1–53.7
See application file for complete search history.

(56) References Cited

U.S. PATENT DOCUMENTS

| | | | |
|---|---|---|---|
| 5,669,842 A | | 9/1997 | Schmidt |
| 6,725,581 B2 * | | 4/2004 | Naruse et al. .................... 37/348 |
| 6,922,990 B2 * | | 8/2005 | Naruse et al. .................... 60/414 |
| 6,945,039 B2 * | | 9/2005 | Yoshino ............................ 60/414 |
| 7,086,226 B2 * | | 8/2006 | Oguri ................................ 60/414 |
| 7,104,920 B2 * | | 9/2006 | Beaty et al. ......................... 477/5 |
| 7,525,206 B2 * | | 4/2009 | Kagoshima et al. ......... 290/40 C |
| 7,657,350 B2 * | | 2/2010 | Moran ............................. 701/22 |
| 2005/0012337 A1* | | 1/2005 | Yoshimatsu ................. 290/40 C |
| 2006/0116797 A1* | | 6/2006 | Moran ............................. 701/22 |
| 2007/0096667 A1* | | 5/2007 | Komiyama et al. ............. 318/98 |
| 2007/0227801 A1 | | 10/2007 | Loeffler |
| 2008/0093864 A1* | | 4/2008 | Kagoshima et al. ......... 290/40 A |
| 2009/0018716 A1 | | 1/2009 | Ambrosio |
| 2009/0095549 A1 | | 4/2009 | Dalum et al. |

OTHER PUBLICATIONS

Written Opinion of the International Searching Authority—PCT/US2009/037664 dated Aug. 3, 2009.
International Search Report of the International Searching Authority—PCT/US2009/037664 dated Aug. 3, 2009.

* cited by examiner

*Primary Examiner* — J. Allen Shriver, II
*Assistant Examiner* — Erez Gurari
(74) *Attorney, Agent, or Firm* — Cantor Colburn LLP

(57) ABSTRACT

A power supply for powering a hydraulic implement includes: an electric storage unit; an electric motor, an electric generator, a hydraulic pump and a control unit; the electric motor adapted for receiving electric power and driving the hydraulic pump to power the hydraulic implement; the electric generator adapted for translating mechanical energy into the electric power; the electric storage unit also being adapted for providing the electric power; and the control unit for selecting a source of the electric power from one of the generator and the electric storage unit. A method for operating the power supply and a vehicle are also provided.

17 Claims, 3 Drawing Sheets

HYBRID DRIVE FOR HYDRAULIC POWER

BACKGROUND OF THE INVENTION

1. Field of the Invention

This invention relates to hydraulic drives, and particularly to a hydraulic drive that is driven by a hybrid power supply.

2. Description of the Related Art

Many work vehicles make use of hydraulic systems. For example, consider a traditional utility truck used for servicing residential telephone, electric and cable supplies. Such vehicles with hydraulic systems on-board are virtually ubiquitous in industry. The hydraulic systems provide users with a number of advantages, such as rapid deployment, convenience of use, as well as a robust power supply for tooling (such as hydraulically driven drills). However, such hydraulic systems are not without disadvantages.

Consider that many tasks facilitated by operation of hydraulic systems involve work of a prolonged duration. Accordingly, power supplies on-board the work vehicle are often inadequate to drive the hydraulic system for the duration of the work. One solution is to idle the work vehicle and make use of mechanical output from an engine of the work vehicle. Unfortunately, this is not economic in terms of fuel consumption or vehicle wear. Further, this is of increasing concern to regulatory agencies. More specifically, as the Environmental Protection Agency has pronounced that it does not have the power to enact a nationwide anti-idle law, many states, counties and municipalities have enacted their own rules regarding idling of work vehicles. Given the great variety of these rules, operators of work vehicles are challenged to rely upon traditional methods for powering hydraulic systems on-board work vehicles.

One example of an effort to address the need is provided in U.S. Pat. No. 7,104,920, entitled "Hybrid vehicle powertrain system with power take-off driven vehicle accessory" discloses a hybrid vehicle powertrain system that includes a first prime mover, a first prime mover driven power transmission mechanism having a power take-off adapted to drive a vehicle accessory, and a second prime mover. The second prime mover is operable to drive the power transmission mechanism alone or in combination with the first prime mover to provide power to the power take-off through the power transmission mechanism. The patent further discloses methods for operating a hybrid vehicle powertrain system. Unfortunately, the technology provided in this example has certain drawbacks. By way of example, having a powertrain system that includes the second prime mover, such as an electric or hydraulic motor, may cause excess wear and inefficient operation, among other things.

Accordingly, what are needed are techniques for powering hydraulic systems used in work vehicles. Preferably, the techniques minimize vehicle wear, fuel consumption and are compliant with ant-idle rules and regulations.

SUMMARY OF THE INVENTION

The shortcomings of the prior art are overcome and additional advantages are provided through the provision of a power supply for powering a hydraulic implement, the power supply including: an electric storage unit; an electric motor, an electric generator, a hydraulic pump and a control unit; the electric motor adapted for receiving electric power and driving the hydraulic pump to power the hydraulic implement; the electric generator adapted for translating mechanical energy from a power take off into the electric power; the electric storage unit also being adapted for providing the electric power; and the control unit configured for selecting a source of the electric power from one of the generator and the electric storage unit.

A method for powering a hydraulic implement, the method including: driving a hydraulic pump with an electric motor, the electric motor powered by electric power from an electric storage unit; upon depletion of the electric storage unit, starting an engine to drive a power take off unit; driving a generator with the power take off unit; and charging the electric storage unit and powering the electric motor from the generator.

A vehicle including at least one hydraulic system for powering a hydraulic implement, the vehicle including: a hybrid power supply for powering the hydraulic system, the hybrid power supply including an electric storage unit; an electric motor, an electric generator, a hydraulic pump and a control unit; the electric motor adapted for receiving electric power and driving the hydraulic pump to power the hydraulic implement; the electric generator adapted for translating mechanical energy from a power take off of the vehicle into the electric power; the electric storage unit also being adapted for providing the electric power; and the control unit for selecting a source of the electric power from one of the generator and the electric storage unit.

BRIEF DESCRIPTION OF THE DRAWINGS

The features and advantages of the invention are apparent from the following detailed description taken in conjunction with the accompanying drawings in which.

DETAILED DESCRIPTION OF THE INVENTION

Figure 1:
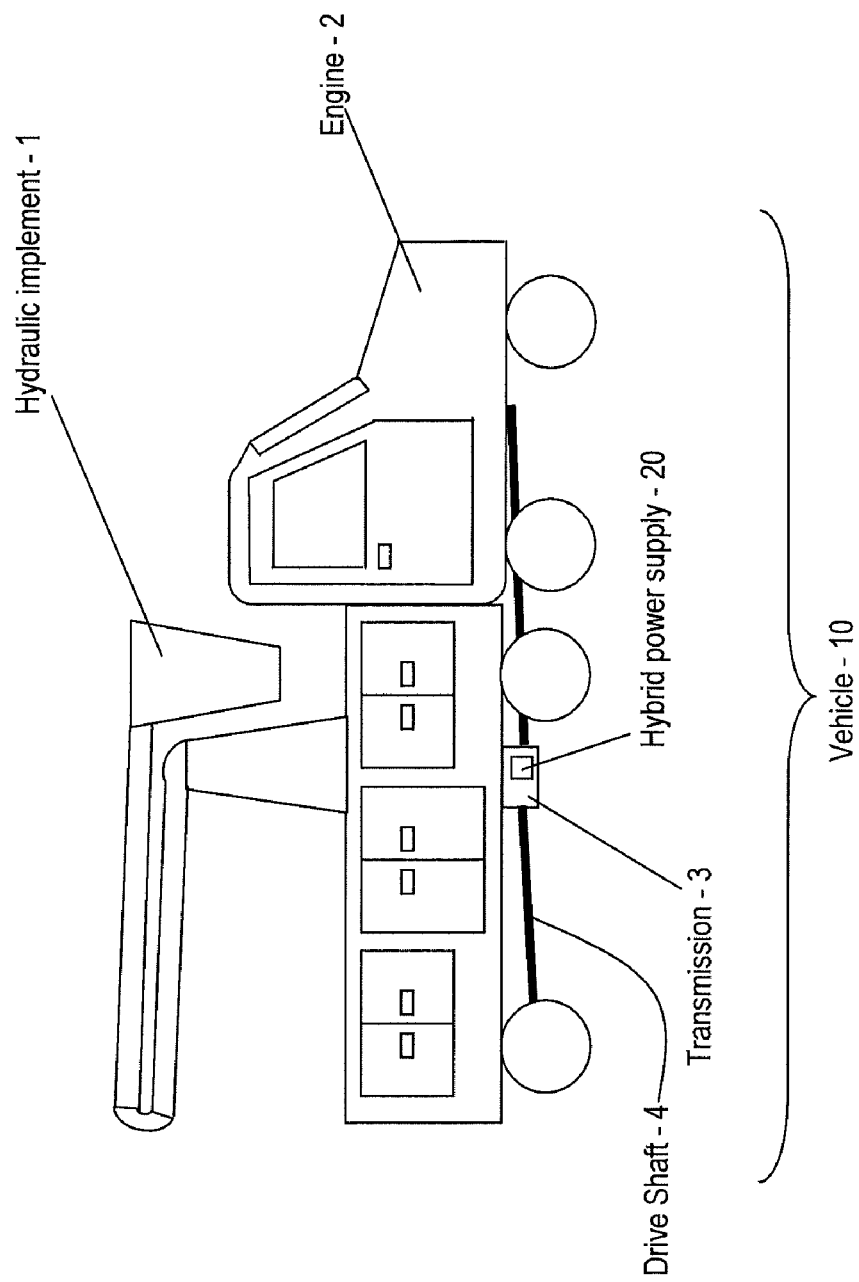
FIG. 1 depicts aspects of a vehicle implementing a hydraulic system.
Figure 2:
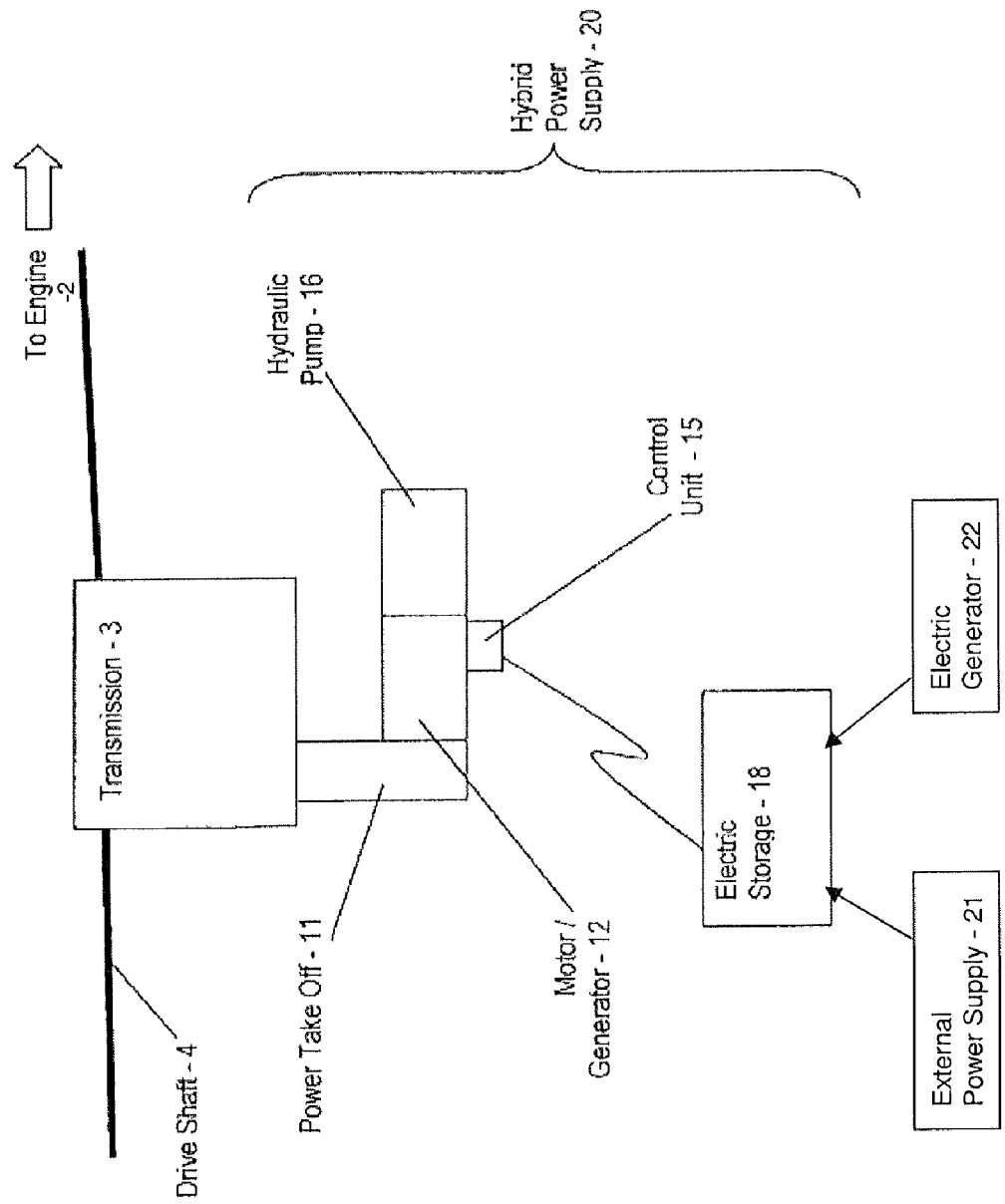
FIG. 2 illustrates aspects of a hybrid power supply for driving the hydraulic system of FIG. 1.

The teachings herein provide a hybrid power supply for driving a hydraulic system. In the examples provided herein, the hydraulic system is implemented on a work vehicle, such as a utility truck to power a hydraulic implement. Advantageously, the hybrid power supply may be added to an existing vehicle as a retrofit, and therefore need not be integrated into a vehicle, such as at the time of manufacture. One skilled in the art will recognize that the embodiments provided are merely illustrative and are not limiting of the invention. FIGS. 1 and 2 provide an illustrative embodiment of the hybrid power supply.

Turning now to FIG. 1 there is shown an embodiment of a vehicle 10. The vehicle 10 includes a hydraulic implement 1. In this example, the hydraulic implement 1 is a bucket lift which provides mobility to a user.

In this embodiment, the vehicle 10 includes an engine 2, a transmission 3 and a drive shaft 4. The engine 2, transmission 3 and drive shaft 4 cooperate as a drive train to provide energy to a hybrid power supply 20. In this embodiment, the energy supplied is rotational energy provided by a power take off, as shown in FIG. 2.

Referring now to FIG. 2, an embodiment of the hybrid power supply 20 includes a motor/generator 12, a hydraulic pump 16, a control unit 15 and an electric storage 18. The motor/generator 12 at least one of drives the hydraulic pump 16 and charges the electric storage 18. The hydraulic pump 16 provides pressurized hydraulic fluid to the hydraulic implement 1 for performing work. Generally, the hydraulic pump 16 is driven by the motor/generator 12, however, the hybrid power supply 20 may further include apparatus for driving the hydraulic pump 16 directly from the power take off 11. The control unit 15 generally governs operation and interface with the hybrid power supply 20.

In general, the motor/generator 12 is unitary and performs a dual role. That is, the motor/generator 12 can be a dual purpose unit which provides rotational energy to the hydraulic pump 16 or electrical energy for charging the electric storage 18. Alternatively, at least one dedicated motor and at least one dedicated generator may be used in the hybrid power supply 20 in place of (or to augment) the motor/generator 12. As an example, in one configuration, the motor/generator 12 receives electric power from the electric storage 18 and provides rotational force to at least one hydraulic pump 16. In another configuration, the motor/generator 12 receives rotational force from the power take off 11, and generates electric power for charging the electric storage 18. Of course, other arrangements for powering the hybrid power supply 20 may be realized. For example, in another embodiment, a separate generator is included with the engine 2 and driven from a crankshaft of the engine 2 by a main belt or an additional belt (not shown).

Included with the hybrid power supply 20 are the electric storage 18 and the control unit 15. In some embodiments, the electric storage 18 includes at least one battery and may include a plurality of batteries. In other embodiments, or in embodiments that are in addition to those with at least one battery, the electric storage 18 includes at least one fuel cell. In short, any resource capable of providing adequate electric supply and storage may be used as the electric storage 18.

The control unit 15 generally governs operation of and interface with the hybrid power supply 20. For example, the control unit 15 may be adapted for monitoring output of the electric storage 18, initiating charging of the electric storage 18, activating and deactivating the motor/generator 12, receiving user commands, starting and stopping of the engine 2, execution of software and other such functions. Having thus described components of the hybrid power supply 20, certain aspects are now discussed in greater detail.

In operation, the hybrid power supply 20 powers the hydraulic pump 16 by using electrical energy from the electric storage 18 (i.e., while the engine 2 is off), by converting mechanical energy from the power take off into electrical energy, or by direct coupling of the hydraulic pump 16 to the power take off 11. By coupling the motor/generator 12 to the power take off 11, the motor/generator 12 provides for powering the hydraulic pump 16 as well as charging of the electric storage 18 while the engine 2 is on.

When the vehicle 10 is appropriately configured (such as by configuring safety interlock devices, for example, by placing the vehicle 10 into park or neutral), and the hybrid power supply 20 is activated, the control unit 15 may provide for monitoring output of the electric storage 18 and starting the engine 2 as necessary. That is, the control unit 15 effectively governs and switches between power supplies for the hydraulic pump 16. More specifically, the control unit 15 will automatically switch between electric power generated by mechanical power from the power take off 11 (i.e., electric power from the generator) and the electric power from the electric storage 18, and vice-versa. During recharging of the electric storage 18, the hydraulic pump 16 will generally continue to operate without interruptions in service.

As one might surmise, a portion of the mechanical power provided by the power take off 11 will be used to charge the electric storage 18, while another portion will drive the hydraulic pump 16. Accordingly, the control unit 15 may be configured in a variety of ways for multiplexing. One embodiment of multiplexing is by having the motor/generator 12 default to charge state (as a generator), with priority given to hydraulic demand (operation as a motor, when needed, to drive the hydraulic pump 16). Another embodiment of multiplexing calls for multiplexing as a function of time, where switching functions of the motor/generator 12 occurs in various (generally rapid) intervals.

During travel of the vehicle 10, the hybrid power supply 20 will generally recharge the electric storage 18. That is, power from the power take off 11 may be continuously converted to electrical energy for charging the electric storage 18. In some embodiments, such as where the motor/generator 12 is large enough, the motor/generator 12 may be used to provide power assistance or braking to the transmission 3 (or other portion of a drive train for the vehicle 10) by backdriving through the power take off 11.

During periods of non-use (e.g., when the vehicle 10 is out of service), the hybrid power supply 20 can be coupled to external power 21. Coupling to external power provides for economic charging of the electric storage 18 (such as at night, when electric power is purchased at off peak rates).

In some embodiments, a separate motor and charging unit are included in the hybrid power supply 20. In these embodiments, a generator may be driven by the engine 2, a belt, or from the power take off 11, while an electric motor and hydraulic pump are remotely mounted. In further embodiments, a separate electric generator 22 (e.g., a liquid fuel generator such as gasoline, diesel or other or a fuel cell) is used in place of or in addition to the engine 2.

Accordingly, the control unit 15 may include a variety of components. Exemplary components of the control unit 15 include those that are adapted for monitoring of electric signals, switching of electric signals, detecting position, governing mechanical engaging and disengagement (such as engaging and disengaging the hydraulic pump 16 and the motor/generator 12) and others.

Further, the control unit 15 may include at least one of a processor, a memory (at least one of read only memory and random access memory), a storage, an interface, a wireless interface, a remote interface, a user input device, a display, an auditory input and an audible output, a network interface, a user input device (such as at least one of a keyboard and a pointing device), at least one of an audible output and an auditory input and any other such devices as are known in the art. Accordingly, the control unit 15 may be controlled by software (machine executable instructions stored on machine readable media) loadable into the control unit 15, or the control unit 15 may be in communication with the software (such as through an interface to a remote source). Accordingly, the control unit 15 may provide users with precise control (such as governing a setpoint for switching between electrical power and mechanical power), diagnostic information (such as identifying electrical performance of each battery in a plurality of batteries) and performance information (such as identifying hydraulic pressure, flow rate, demand, system temperature, oil life) for governing the hybrid power supply 20. In some embodiments, the hybrid power supply is configured to limit idling of the engine 2 (such as by providing a large electric storage 18 capable of extended periods of operation).

Figure 3:
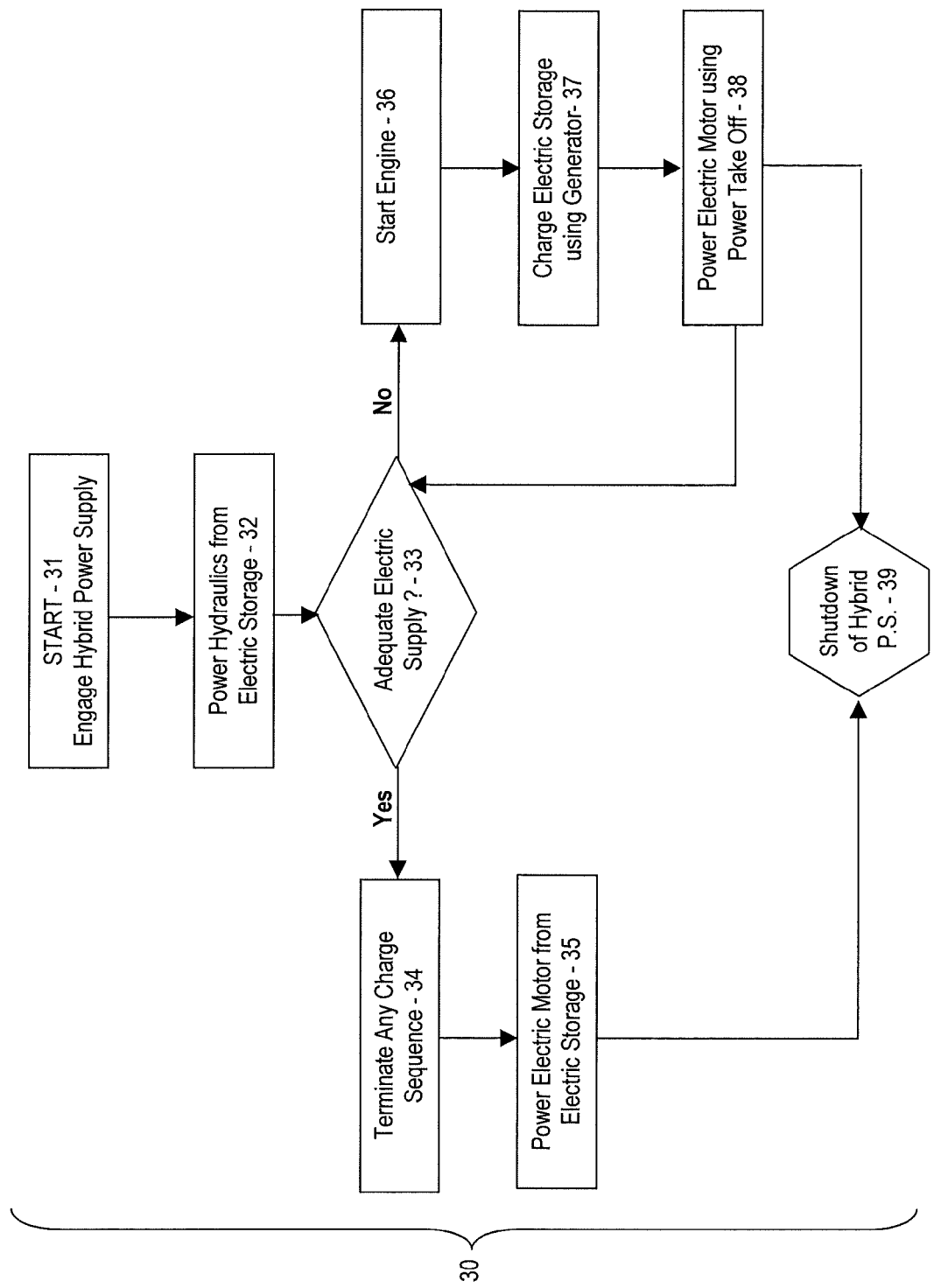
FIG. 3 is a flow chart depicting exemplary logic for operation of the hybrid power supply of FIG. 2.

Referring now to FIG. 3, exemplary logic 30 for operation of the hybrid power supply 20 is provided. In this example, a user starts operation 31 by operation that may be as simple as flipping a switch. In some embodiments, the hybrid power supply 20 will not engage without setting of safety interlocks (such that auto-start of the engine 2 will not cause an unsafe condition). Subsequently, in a first stage of operation 32, the control unit 15 powers the hybrid power supply 20 from the electric storage 18. In an ongoing stage 33, the control unit 15 monitors the electric supply and tests for adequate power. If the power supplied by the electric storage 18 is not adequate, then the control unit 15 initiates a charging sequence. In a first stage of the charging sequence 36, the control unit 15 automatically starts the engine 2 of the vehicle 10. In a next stage of the charging sequence 37, the generator provides electrical output to the electric storage 18. In a demand stage of the charging sequence 38, if a user calls for hydraulic power, the control unit 15 powers the motor/generator 12 and pump 16 using the power take off 11. Once the ongoing stage 33 determines the electric storage 18 is adequately charged, the control unit 15 terminates the charging sequence 34 and shuts down the engine 2. Ultimately, the user performs shutdown 39 of the hybrid power supply.

The hybrid power supply 20 provides numerous advantages over the prior art. For example, the hybrid power supply 20 permits the hydraulic implement 1 to be used beyond exhaustion of a battery of the vehicle 10. The hybrid power supply 20 can be installed as a retrofit (i.e., a kit) into many existing vehicles 10, thus providing for compliance with anti-idle rules and regulations for existing equipment. The hybrid power supply 20 may be used with vehicles having either a manual transmission 3 or an automatic transmission 3.

The flow diagrams depicted herein are just examples. There may be many variations to these diagrams or the steps (or operations) described therein without departing from the spirit of the invention. For instance, the stages may be performed in a differing order, stages may be added, deleted or modified. All of these variations are considered a part of the claimed invention.

Further, it should be recognized that the hydraulic implement 1 may include, without limitation, at least one of a lift, jack, drill, wrench, drive, piston, pump, valve, motor, loader, hoe, scoop, mower, digger and any other hydraulically powered mechanism as is known in the art or may be later devised. The hydraulic implement 1 may be a dedicated component (such as one permanently affixed to the vehicle 10), or one that is temporarily attached (such as through a coupling or port for switchable use of hydraulic implements). The hybrid power supply 20 may be used in conjunction with any vehicle 10 providing the hydraulic implement 1. In addition, the hybrid power supply 20 may include a plurality of the components disclosed herein. For example, the hybrid power supply 20 may include a plurality of motors, generators, combination motor/generator units, electric storage units, hydraulic pumps, control units and other supporting components and accessories.

In support of the teachings herein, various computer components including software may be had to provide for operation and analyses of the apparatus and methods disclosed herein. Accordingly, it is considered that these teachings may be implemented in conjunction with a set of computer executable instructions stored on a computer readable medium, comprising ROM, RAM, CD ROM, flash or any other computer readable medium, now known or unknown, that when executed cause a computer to implement the method of the present invention. These instructions may provide for equipment operation, control, data collection and analysis and other functions deemed relevant by a user.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A power supply for powering a hydraulic implement, the power supply comprising:
   an electric storage unit, an electric motor, an electric generator, a hydraulic pump and a control unit, the electric motor, the electric generator and the hydraulic pump abut against one another in direct contact;
   the electric motor adapted for receiving electric power and driving the hydraulic pump to power the hydraulic implement;
   the electric generator adapted for translating mechanical energy from a power take off into the electric power;
   the electric storage unit also being adapted for providing the electric power; and
   the control unit configured for automatically switching between electric power from the generator driven by an engine coupled to the power take off and electric power from the electric storage unit coupled to the electric motor, the electric motor driving the hydraulic pump unassisted by the engine.

2. The power supply as in claim 1, wherein the control unit is adapted for directing at least a portion of the electric power from the generator to the electric storage unit.

3. The power supply as in claim 1, wherein the control unit is adapted for automatically starting the engine to provide the mechanical energy based on the charge in the electric storage unit.

4. The power supply as in claim 3, wherein the control unit is adapted for automatically shutting down the engine based on the charge in the electric storage unit.

5. The power supply as in claim 1, further comprising an electrical connection for coupling to at least one of another separate electrical generator and an external power supply.

6. The power supply as in claim 1, wherein the electric storage unit comprises at least one of a battery and a fuel cell.

7. The power supply as in claim 1 wherein the electric generator is adapted for coupling with a power take off.

8. The power supply as in claim 1, wherein a single unit comprises the electric motor and the electric generator.

9. The power supply as in claim 1, wherein the control unit comprises at least one of a processor, a memory, a storage, an interface, a wireless interface, a remote interface, a user input device, a display, an auditory input and an audible output.

10. A method for powering a hydraulic implement, the method comprising:
   driving a hydraulic pump with an electric motor, the electric motor powered by electric power from an electric storage unit, the electric motor and the hydraulic pump abut against each other in direct contact, the hydraulic pump configured for driving the electric motor;
   upon depletion of the electric storage unit, starting an engine to drive a power take off unit;
   driving a generator with the power take off unit; and
   charging the electric storage unit and powering the hydraulic pump from the power take off unit coupled to the engine.

11. The method as in claim 10, further comprising shutting down the generator when the electric storage unit is adequately charged.

12. The method as in claim 10, further comprising continuously monitoring the depletion.

13. The method as in claim 10, further comprising at least one of tracking performance, obtaining diagnostic information and governing a setpoint for indication of at least one of depletion and adequate charge.

14. The method as in claim 10, wherein starting the generator further comprises starting at least one of the engine and a separate electrical generator.

15. A vehicle comprising at least one hydraulic system for powering a hydraulic implement, the vehicle comprising:

a hybrid power supply for powering the hydraulic system, the hybrid power supply comprising an electric storage unit; an electric motor, an electric generator, a hydraulic pump and a control unit, the electric motor, the electric generator and the hydraulic pump abut against one another in direct contact; the electric motor adapted for receiving electric power and driving the hydraulic pump to power the hydraulic implement; the electric generator adapted for translating mechanical energy from a power take off of the vehicle into the electric power; the electric storage unit also being adapted for providing the electric power; and the control unit for automatically switching between electric power from the generator driven by an engine coupled to the power take off and electric power from the electric storage unit coupled to the electric motor, the electric motor driving the hydraulic pump unassisted by the engine.

16. The vehicle as in claim 15, wherein the hybrid power supply is adapted for at least one of assisting an engine of the vehicle and braking the vehicle.

17. A power supply for powering a hydraulic implement, the power supply comprising:

a hydraulic pump hydraulically connected to the hydraulic implement;

an electric motor/generator and the hydraulic pump abut against one another in direct contact, the electric motor/generator configured to drive the hydraulic pump;

an electric storage unit coupled to the electric motor/generator for delivery of electric power thereto for driving the hydraulic pump;

a power take-off mechanically coupled to the electric motor/generator for delivery of mechanical power thereto and generation of electric power thereby for driving the hydraulic pump; and a control unit configured to automatically switch the operation of the electric motor/generator between electric power from the electric storage unit and mechanical power from the power-take off, wherein the electric motor/generator is configured to drive the hydraulic pump unassisted by the power take-off, the control unit is adapted for automatically shutting down the engine based on the charge in the electric storage unit.

* * * * *